United States Patent
Hu et al.

(10) Patent No.: US 9,824,430 B2
(45) Date of Patent: Nov. 21, 2017

(54) METHOD AND APPARATUS FOR ADJUSTING IMAGE BRIGHTNESS

(71) Applicant: Tencent Technology (Shenzhen) Co., Ltd., Shenzhen, Guangdong (CN)

(72) Inventors: Shimin Hu, Guangdong (CN); Jianyu Wang, Guangdong (CN); Baoli Li, Guangdong (CN); Haifeng Deng, Guangdong (CN); Xianying Li, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 302 days.

(21) Appl. No.: 14/806,142

(22) Filed: Jul. 22, 2015

(65) Prior Publication Data
US 2015/0324961 A1 Nov. 12, 2015

Related U.S. Application Data

(63) Continuation of application No. PCT/CN2013/087193, filed on Nov. 15, 2013.

(30) Foreign Application Priority Data

Jan. 23, 2013 (CN) .......................... 2013 1 0025149

(51) Int. Cl.
*G06K 9/40* (2006.01)
*G06T 5/20* (2006.01)
(Continued)

(52) U.S. Cl.
CPC ................ *G06T 5/20* (2013.01); *G06T 5/002* (2013.01); *G06T 5/009* (2013.01); *G06T 5/40* (2013.01); *G06T 5/50* (2013.01)

(58) Field of Classification Search
CPC ........... G06T 5/20; G06T 5/002; G06T 5/009; G06T 5/40; G06T 5/50
See application file for complete search history.

(56) References Cited

U.S. PATENT DOCUMENTS

2007/0286481 A1* 12/2007 Monobe .................. G06T 5/009
382/169
2016/0358320 A1* 12/2016 Wang ........................ G06T 5/50

FOREIGN PATENT DOCUMENTS

CN 101437114 A 5/2009
CN 101437114 B * 6/2010
(Continued)

OTHER PUBLICATIONS

International Search Report Received in PCT Application No. PCT/CN2013/087193 dated Feb. 27, 2014.

*Primary Examiner* — Jonathan S Lee
(74) *Attorney, Agent, or Firm* — Brinks Gilson & Lione

(57) ABSTRACT

Provided are a method and an apparatus for adjusting image brightness. The method includes: acquiring an image to be processed, and acquiring a single-channel brightness image based on grayscales of each channel of the image to be processed; performing Gaussian filtering on the single-channel brightness image to acquire a Gaussian filtered image; adjusting grayscales of the Gaussian filtered image based on the grayscales of the Gaussian filtered image and a preset proportion; comparing the Gaussian filtered image after adjustment with the Gaussian filtered image before adjustment to acquire a grayscale change rate of each pixel through adjustment; processing the image to be processed based on the grayscale change rate of each pixel to acquire a processed image; and outputting the processed image.

14 Claims, 3 Drawing Sheets

(51) Int. Cl.
  *G06T 5/00* (2006.01)
  *G06T 5/40* (2006.01)
  *G06T 5/50* (2006.01)

(56) References Cited

FOREIGN PATENT DOCUMENTS

| | | | |
|---|---|---|---|
| CN | 102411775 A | | 4/2012 |
| CN | 102750535 A | | 10/2012 |
| CN | 102750535 B | * | 3/2014 |
| KR | 20070046010 A | | 5/2007 |

* cited by examiner

METHOD AND APPARATUS FOR ADJUSTING IMAGE BRIGHTNESS

CROSS-REFERENCE TO RELATED APPLICATIONS

This application is a continuation of International Application No. PCT/CN2013/087193 filed on Nov. 15, 2013 and entitled "METHOD AND APPARATUS FOR ADJUSTING IMAGE BRIGHTNESS", which claims priority to Chinese Patent Application No. 201310025149.0, filed with State Intellectual Property Office of the PRC on Jan. 23, 2013 and entitled "METHOD AND APPARATUS FOR ADJUSTING IMAGE BRIGHTNESS", which are incorporated herein by reference in their entireties.

FIELD OF THE TECHNOLOGY

The present disclosure relates to the field of digital image processing, and in particular, to a method and an apparatus for adjusting image brightness.

BACKGROUND OF THE DISCLOSURE

Digital image processing (DIP), also called computer image processing, refers to a process of converting an image signal into a digital signal and processing the digital signal with computer. By processing an image with DIP technology, useful information can be acquired to the maximum extent. However, due to impacts of factors such as lighting, environments, and equipment, an image may have a shadowy part and a highlighted part. Adjustment on the shadowy part and the highlighted part may directly affect visual perception of human during observation and quality of the image.

Automatic partial adjustment on shadow and highlight of an image is mainly performed with a histogram-based method, for example, the histogram equalization, i.e., performing nonlinear extension on an image, and reallocating pixel values of the image to make the number of pixels in a certain grayscale range approximately the same and change histogram distribution of the given image into "even" histogram distribution.

Brightness information of an image is adjusted by using the histogram-based method. Because histogram equalization is indiscriminate in processed image data, contrast of background noise may be increased and contrast of useful signals may be reduced. Moreover, a case of partial discontinuity is apt to occur in a processed image, resulting in loss of detailed information in the image.

SUMMARY

To solve problems existing in image brightness adjustment, embodiments of the present disclosure provide a method and an apparatus for adjusting image brightness. The technical solutions are described as follows.

According to an aspect, a method for adjusting image brightness is provided, including:

acquiring an image to be processed, and acquiring a single-channel brightness image based on grayscales of each channel of the image to be processed;

performing Gaussian filtering on the single-channel brightness image to acquire a Gaussian filtered image;

adjusting grayscales of the Gaussian filtered image based on the grayscales of the Gaussian filtered image and a preset proportion;

comparing the Gaussian filtered image after adjustment with the Gaussian filtered image before adjustment to acquire a grayscale change rate of each pixel through adjustment;

processing the image to be processed based on the grayscale change rate of each pixel to acquire a processed image; and outputting the processed image.

According to another aspect, an apparatus for adjusting image brightness is provided, including:

a first acquiring module, configured to acquire an image to be processed, and acquire a single-channel brightness image based on grayscales of each channel of the image to be processed;

a second acquiring module, configured to perform Gaussian filtering on the single-channel brightness image to acquire a Gaussian filtered image;

an adjustment module, configured to adjust grayscales of the Gaussian filtered image based on the grayscales of the Gaussian filtered image and a preset proportion;

a third acquiring module, configured to compare the Gaussian filtered image after adjustment with the Gaussian filtered image before adjustment to acquire a grayscale change rate of each pixel through adjustment;

a fourth acquiring module, configured to process the image to be processed based on the grayscale change rate of each pixel to acquire a processed image; and an output module, configured to output the processed image.

The technical solutions provided in the embodiments of the present disclosure have the following beneficial effects.

The embodiments of the present disclosure provide a method and an apparatus for adjusting image brightness. Grayscales of each channel of an image are processed as follows: an image to be processed is acquired, and a single-channel brightness image is acquired based on grayscales of each channel of the image to be processed; Gaussian filtering is performed on the single-channel brightness image to acquire a Gaussian filtered image; grayscales of the Gaussian filtered image are adjusted based on the grayscales of the Gaussian filtered image and a preset proportion; the Gaussian filtered image after adjustment is compared with the Gaussian filtered image before adjustment to acquire a grayscale change rate of each pixel through adjustment; the image to be processed is processed based on the grayscale change rate of each pixel to acquire a processed image; and the processed image is output. In the technical solutions provided in the embodiments of the present disclosure, an expression capability of all color channels is fully used; overall continuity of the image is ensured by performing Gaussian filtering on the single-channel brightness image; and the Gaussian filtered image is adjusted based on the preset proportion, so that a shadowy area and a highlighted area in the Gaussian filtered image tend to be neutral and more suitable for visual observation.

BRIEF DESCRIPTION OF THE DRAWINGS

To describe the technical solutions of embodiments of the present disclosure more clearly, the following briefly introduces the accompanying drawings to be used for describing the embodiments. Apparently, the accompanying drawings in the following description are only for some embodiments of the present disclosure, and a person of ordinary skill in the art may further derive other drawings based on these accompanying drawings without creative efforts.

DESCRIPTION OF EMBODIMENTS

To make the objectives, technical solutions, and advantages of the present disclosure clearer, embodiments of the present disclosure are described in detail hereinafter with reference to the accompanying drawings.

Figure 1:
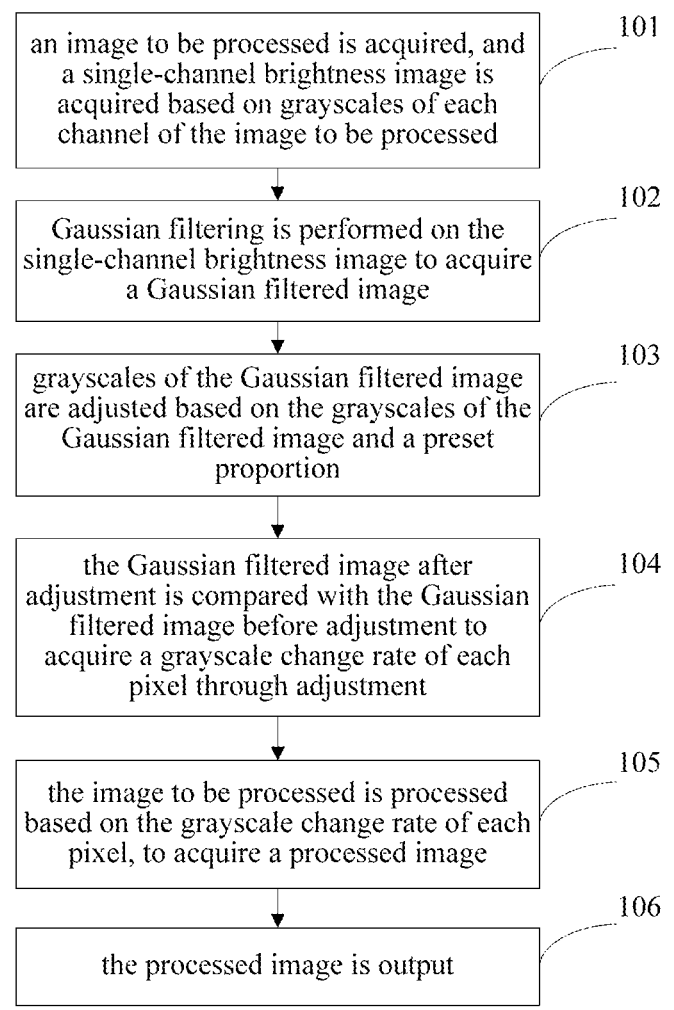
FIG. 1 is a flowchart of a method for adjusting image brightness according to an embodiment of the present disclosure.

FIG. 1 is a flowchart of a method for adjusting image brightness according to an embodiment of the present disclosure. In the embodiment, the method may be executed by a device having an image processing capability, for example, a personal computer, a video recording device, or a server. As shown in FIG. 1, the method includes steps 101-106.

In 101, an image to be processed is acquired, and a single-channel brightness image is acquired based on grayscales of each channel of the image to be processed.

In an example, the image to be processed is a digital image, that is, an image represented in a form of a two-dimensional array. A person skilled in the art may know that the basic element of the digital image is a pixel, and the pixel is obtained by performing discretization on a continuous space during analog image digitization. Each pixel has location coordinates of an integer row (a height) and an integer column (a width), and each pixel has an integer grayscale value or an integer color value.

Grayscale is quantization of changes in brightness of an image and is used to represent shades of the brightness. Generally, grayscale quantization has 256 gray scales, that is, the grayscale ranges from 0 to 255. Changes with the range 0-255 represent brightness varying from dark to light, which corresponds to color in image varying from black to white. A grayscale range of an image may also be represented by 0 to 1, where 0 represents black, 1 represents white, and values between 0 and 1 represent dark gray to light gray.

The single-channel brightness image refers to an image formed by a maximum grayscale acquired by comparing grayscales of respective channels of each pixel in the image to be processed.

For an image that only has one channel, such as a grayscale image, the image is used as the single-channel brightness image.

For an image that has three channels (three channels of R (Red), G (Green), and B (Blue)), each pixel of an image has three grayscales, and each grayscale corresponds to one channel. For each pixel, grayscales of the three channels of the pixel are compared to acquire a maximum value from the three grayscales, the maximum value is used as the grayscale of the pixel, and then the single-channel brightness image is obtained.

That is, for the image to be processed that has the three channels, grayscales of R, G, and B of each pixel of the image to be processed are compared to acquire a maximum grayscale of each pixel, and the maximum grayscales of respective pixels are used as grayscales of respective pixels of the single-channel brightness image, thereby acquiring the single-channel brightness image.

For an image in another color mode, the image may be first converted into an RGB image, and then a single-channel brightness image of the RGB image is acquired. Alternatively, an image corresponding to a channel representing brightness in the image in the another color mode may be directly used as the single-channel brightness image. The embodiment of the present disclosure is described by merely using that the image to be processed is an RGB image as an example.

In 102, Gaussian filtering is performed on the single-channel brightness image to acquire a Gaussian filtered image.

In an example, after the single-channel brightness image is acquired in step 101, the image needs to be filtered to ensure continuity of the image. A Gaussian filter has a desirable filtering effect. Therefore, preferably, in the embodiment of the present disclosure, the Gaussian filter is used to filter the single-channel brightness image. Meanwhile, a proper size is chosen according to a size of the image. Preferably, a radius of Gaussian filtering is 5 to 20 pixels.

The image to be processed is input into the Gaussian filter, so that a convolution calculation is performed on the image to be processed and a filtering function of the Gaussian filter, to acquire the Gaussian filtered image. It should be noted that a size of the Gaussian filtered image has to be consistent with that of the image to be processed. A smooth Gaussian filtered image is acquired by performing Gaussian filtering on the single-channel image, thereby avoiding discontinuity of grayscales of the image.

In step 102, the single-channel brightness image is input into the Gaussian filter, and Gaussian filtering is performed on the single-channel brightness image by applying the filtering function of the Gaussian filter, to acquire the Gaussian filtered image.

Preferably, in step 102, Gaussian filtering may be performed by applying a one-dimensional zero-mean discrete Gaussian filter function shown in the following formula (1):

$$g(x) = e^{-\frac{x^2}{2\sigma^2}} \quad (1)$$

where x is a location coordinate of a Gaussian filter, g(x) is a value of the Gaussian filter at x, and σ is a Gaussian distribution parameter that determines smoothness of an image after Gaussian filtering, where if σ is larger, the smoothness of the image is higher, and if σ is smaller, the smoothness of the image is lower.

Optionally, for processing on a two-dimensional image, a one-dimensional Gaussian filtering function may be used twice to perform a smooth filtering on the image, or a two-dimensional Gaussian filtering function may be used once to perform a smooth filtering on the image. In actual use, the two-dimensional Gaussian filtering function is often used to implement the smooth filtering on the image by using a filtering function once.

Preferably, in step 102, Gaussian filtering may be performed by applying a two-dimensional zero-mean discrete Gaussian filter function shown in the following formula (2):

$$g[i, j] = e^{-\frac{i^2+j^2}{2\sigma^2}} \quad (2)$$

where i and j represent location information of a two-dimensional Gaussian filter, g[i, j] is a value of the two-dimensional Gaussian filter at a location i and j, and σ is a Gaussian distribution parameter that determines smoothness of the image after Gaussian filtering, where if σ is larger, the smoothness of the image is higher, and if σ is smaller, the smoothness of the image is lower.

In the embodiment of the present disclosure, the Gaussian filter is a category of linear smoothing filter that chooses a weighted value according to a shape of a Gaussian function. Gaussian filtering is performed on the single-channel brightness image by using the Gaussian filter, so as to achieve effects of smoothing the image and eliminating noise and avoid discontinuity of the image.

It should be noted that during an actual application, the filtering function of the filter and parameters of the function need to be adjusted according to the size of the image and a filtering degree, which is not specifically limited in the embodiment of the present disclosure.

In 103, grayscales of the Gaussian filtered image are adjusted based on the grayscales of the Gaussian filtered image and a preset proportion.

Specifically, the number of pixels corresponding to each grayscale can be obtained by performing a statistic analysis on the grayscales of the Gaussian filtered image acquired in step 102. A grayscale corresponding to the preset proportion is used as a first grayscale. An area formed by pixels having grayscales less than the first grayscale is used as a shadowy area, and an area formed by pixels having grayscales greater than the first grayscale is used as a highlighted area. After the shadowy area and the highlighted area of the Gaussian filtered image are acquired, grayscales of pixels in the shadowy area and grayscales of pixels in the highlighted area are separately adjusted to acquire grayscales after adjustment.

In 104, the Gaussian filtered image after adjustment is compared with the Gaussian filtered image before adjustment to acquire a grayscale change rate of each pixel through adjustment.

Specifically, the grayscale change rate of each pixel can be obtained by performing a ratio operation on the grayscale of the pixel in the Gaussian filtered image after adjustment and the grayscale of the pixel in the Gaussian filtered image before adjustment. The grayscale change rate of each pixel is used for adjustment of brightness of the image to be processed.

In an example, the ratio operation is performed on the grayscale of each pixel in the Gaussian filtered image after adjustment and the grayscale of each corresponding pixel in the Gaussian filtered image before adjustment. It should be noted that "corresponding" in the embodiment of the present disclosure refers to pixels at the same location. The grayscale change rate of each pixel can be acquired by using a ratio of the grayscales of each corresponding pixel. A formula for calculating the grayscale change rate is as follows:

$$T(p) = \frac{L_2(p)}{L_1(p)} \quad (3)$$

where p is location coordinates in the image, p is in a range of [1, M×N], M represents the number of rows of the image, N represents the number of columns of the image, M and N are positive integers, $L_2(p)$ is a grayscale corresponding to a pixel whose location coordinates in the Gaussian filtered image after adjustment are p, and $L_1(p)$ is a grayscale corresponding to a pixel whose location coordinates in the Gaussian filtered image before adjustment are p.

If the grayscale change rate is greater than 1, the pixel belongs to the shadowy area, and if a value of the change rate is larger, a brightness adjustment proportion of the pixel is larger. If the grayscale change rate equals 1, the pixel belongs to neither the shadowy area nor the highlighted area, and no change occurs in the pixel. If the grayscale change rate is less than 1, the pixel belongs to the highlighted area, and if the value of the change rate is smaller, the brightness adjustment proportion of the pixel is larger.

In 105, the image to be processed is processed based on the grayscale change rate of each pixel, to acquire a processed image.

Specifically, grayscale values of the shadowy area in the image to be processed can be increased (that is, the shadowy area can be lightened) and grayscale values of the highlighted area can be reduced (that is, the highlighted area can be dimmed) by multiplying the grayscale change rate of each pixel by the grayscale of each corresponding pixel in the image to be processed, and the image with the shadowy area lightened and the highlighted area dimmed is used as the processed image.

In 106, the processed image is output.

The processed image is output. As compared with an original image, the processed image has an increased contrast and more detailed information, and accordingly, the processed image is more suitable for visual observation.

In the embodiment of the present disclosure, grayscales of each channel of an image to be processed are processed as follows: an image to be processed is acquired, and a single-channel brightness image is acquired based on grayscales of each channel of the image to be processed; Gaussian filtering is performed on the single-channel brightness image to acquire a Gaussian filtered image; grayscales of the Gaussian filtered image are adjusted based on the grayscales of the Gaussian filtered image and a preset proportion; the Gaussian filtered image after adjustment is compared with the Gaussian filtered image before adjustment to acquire a grayscale change rate of each pixel through adjustment; the image to be processed is processed based on the grayscale change rate of each pixel to acquire a processed image; and the processed image is output. In the technical solution provided in the embodiment of the present disclosure, an expression capability of all color channels is fully used; Gaussian filtering is performed on a single-channel brightness image, so that overall continuity of the image is ensured; and a Gaussian filtered image is adjusted based on a preset proportion, so that a shadowy area and a highlighted area in the Gaussian filtered image tend to be neutral and more suitable for visual observation.

Figure 2:
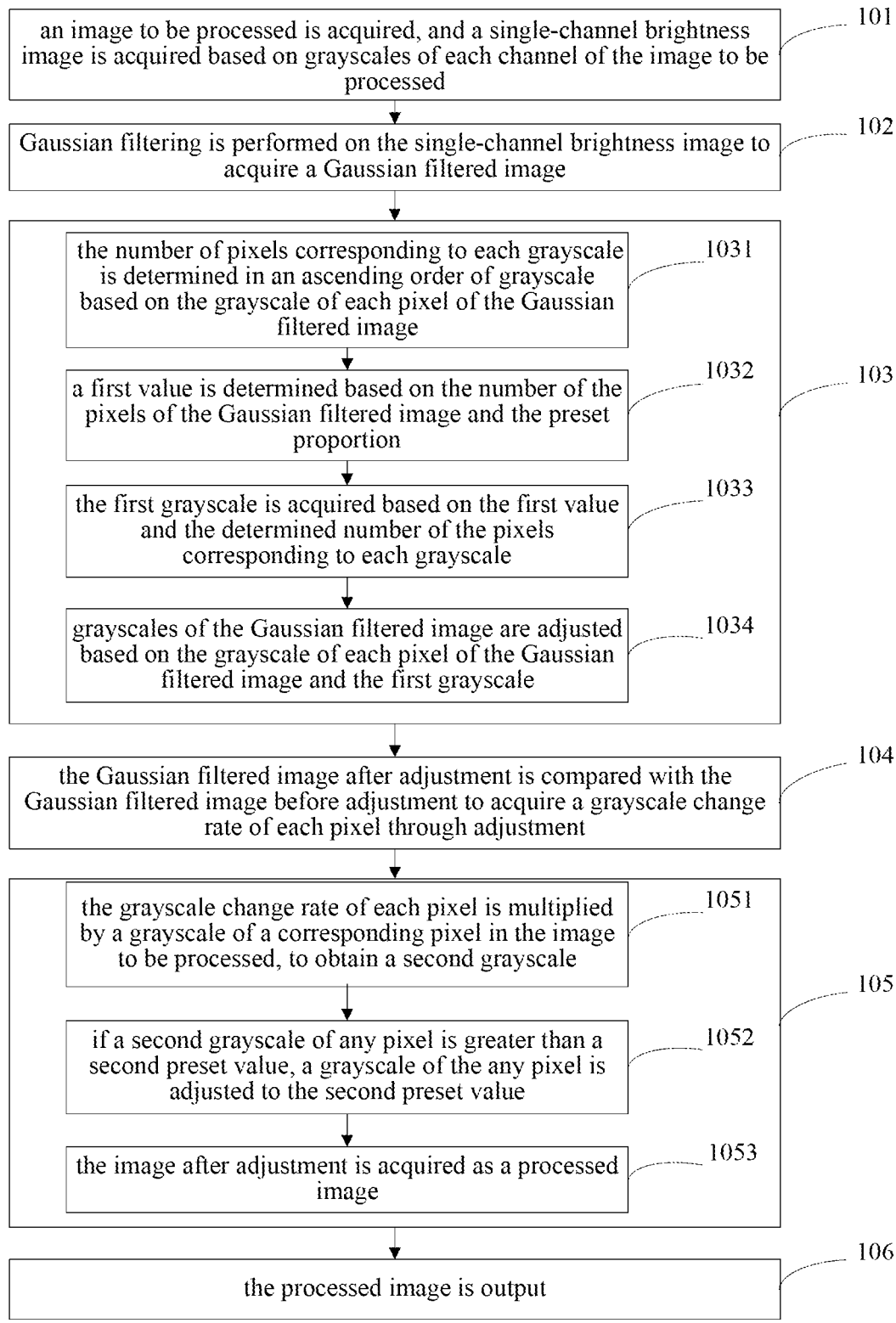
FIG. 2 is a flowchart of a method for adjusting image brightness according to an embodiment of the present disclosure.

FIG. 2 is a specific flowchart of a method for adjusting image brightness according to an embodiment of the present disclosure. The embodiment of the present disclosure is described by merely using that an image to be processed is an RGB image as an example. Specific implementation processes of step 103 and step 105 are mainly described hereinafter with reference to FIG. 2.

After the Gaussian filtered image is acquired in step 102, in 1031, the number of pixels corresponding to each grayscale is determined in an ascending order of grayscale based on the grayscale of each pixel of the Gaussian filtered image.

Counting the number of pixels corresponding to each grayscale of the Gaussian filtered image is equivalent to performing histogram statistics on the Gaussian filtered image. The number of pixels corresponding to each grayscale is acquired in an ascending order of grayscale. A horizontal axis of the histogram indicates a grayscale, and a vertical axis of the histogram indicates the number of pixels corresponding to the grayscale.

In 1032, a first value is determined based on the number of the pixels of the Gaussian filtered image and the preset proportion.

The number of the pixels of the Gaussian filtered image needs to be kept consistent with the number of the pixels of the image to be processed. Because in subsequent steps, the grayscale change rate acquired from the Gaussian filtered image is used to process the image to be processed, the total number of the pixels of the Gaussian filtered image needs to be the same as that of the image to be processed. If the size of the image to be processed is M rows and N columns, the number of the pixels of the image to be processed is M×N. The number of the pixels of the Gaussian filtered image also should be M×N. The processing on the total number of pixels of the image can be implemented in a filtering process in step 202.

The number of the pixels of the Gaussian filtered image is multiplied by the preset proportion to acquire the first value, where the first value can be used to acquire a first grayscale below, thereby distinguishing the shadowy area and the highlighted area in the image. The preset proportion may be set according to an actual case of the image. If the shadowy area in the image is large and the highlighted area is small, the preset proportion may be set to be large, for example, 80%. If the shadowy area in the image is small and the highlighted area is large, the preset proportion may be set to be small, for example, 20%.

In 1033, the first grayscale is acquired based on the first value and the determined number of the pixels corresponding to each grayscale.

The first grayscale is used to distinguish the shadowy area and the highlighted area of the image. To well adjust the brightness of the image, pixels having grayscales less than the first grayscale are used as the shadowy area, and pixels having grayscales greater than the first grayscale are used as the highlighted area, so as to separately adjust brightness in the two areas. After the first value is determined, the numbers of the pixels corresponding to respective grayscales of the Gaussian filtered image are accumulated one by one in an ascending order of grayscale. Accumulation stops when an accumulation result obtained before adding the number of the pixels corresponding to one grayscale is less than the first value and an accumulation result obtained after adding the number of the pixels corresponding to the one grayscale is greater than or equal to the first value. The one graysale is taken as the first grayscale.

Steps 1031 to 1033 are an exemplary process of acquiring, based on the number of pixels of the Gaussian filtered image, the grayscale of each pixel and the preset proportion, the first grayscale used for distinguishing a shadowy area and a highlighted area of the image.

In 1034, grayscales of the Gaussian filtered image are adjusted based on the grayscale of each pixel of the Gaussian filtered image and the first grayscale.

In an example, if a grayscale of a first pixel of the Gaussian filtered image is less than the first grayscale, it is indicated that an area formed by the first pixel is a shadowy area, the grayscale of the first pixel is adjusted by applying $$L_2(p) = \frac{L_1(p) \times \left(1 + \frac{1}{s}\right)}{\frac{L_1(p)}{m} + \frac{1}{s}},$$

where p is location coordinates of the first pixel in the Gaussian filtered image, $L_2(p)$ is a grayscale of the first pixel after adjustment, $L_1(p)$ is a grayscale of the first pixel before adjustment, s is a preset parameter and s>0, and m is the first grayscale.

The first pixel refers to any pixel in the Gaussian filtered image. p used in the formula described above represents the location coordinates of the first pixel. If the size of the Gaussian filtered image is M rows and N columns, p is in the range of [1, M×N]. The location coordinates of a two-dimensional image may be represented by data having two components, or may be represented by using a single quantity. For example, for an image whose size is M rows and N columns, location coordinates of a pixel in an $i^{th}$ row and a $j^{th}$ column may be represented as [i, j], or may be represented as M×i+j, where these two representation manners can be converted into each other. The embodiment of the present disclosure is described by merely using that the location coordinates of a pixel are represented by one piece of data as an example. In an actual application, one piece of data or data having two components may be used, which is not specifically limited in the embodiment of the present disclosure.

Pixels in the Gaussian filtered image, whose grayscales are less than the first grayscale, are traversed by using the formula described above, so as to implement adjustment on the shadowy area. By performing a nonlinear adjustment the grayscale of each pixel in the shadowy area of the image with the nonlinear transformation formula described above, brightness of the shadowy area is increased, local contrast is enhanced, and detailed information are highlighted, leading to convenient visual observation.

If a grayscale of a first pixel of the Gaussian filtered image is equal to the first grayscale, no adjustment is performed on the grayscale of the first pixel.

If a grayscale of a first pixel of the Gaussian filtered image is equal to the first grayscale, it indicates that the grayscale of the first pixel is suitable for visual observation and the brightness is moderate. Therefore, no adjustment is performed on grayscales of these pixels. That is:

$$L_2(p) = L_1(p) \tag{4}$$

where p is location coordinates of the first pixel in the Gaussian filtered image, $L_2(p)$ is a grayscale of the first pixel after adjustment, and $L_1(p)$ is a grayscale of the first pixel before adjustment.

If a grayscale of a first pixel of the Gaussian filtered image is greater than the first grayscale, it is indicated that an area formed by the first pixel is a highlighted area, the grayscale of the first pixel is adjusted by applying $$L_2(p) = 1 - \frac{(1 - L_1(p)) \times \left(1 + \frac{1}{h}\right)}{\frac{1 - L_1(p)}{1 - m} + \frac{1}{h}},$$

where p is location coordinates of the first pixel in the Gaussian filtered image, $L_2(p)$ is a grayscale of the first pixel after adjustment, $L_1(p)$ is a grayscale of the first pixel before adjustment, h is a preset parameter and h>0, and m is the first grayscale.

Pixels in the Gaussian filtered image, whose grayscales are greater than the first grayscale, are traversed by using the formula described above, so as to implement adjustment on the highlighted area. By performing a nonlinear adjustment on the grayscale of each pixel in the highlighted area of the image with the nonlinear transformation formula described above, brightness of the highlighted area is decreased, the local contrast is enhanced, and the detailed information is highlighted, leading to convenient visual observation.

Steps 1031 to 1034 are an example of a specific process of step 103 described above, i.e., adjusting grayscales of the Gaussian filtered image based on the grayscales of the Gaussian filtered image and the preset proportion.

Specific process of step 105 is described as follows.

After acquiring a grayscale change rate of each pixel through adjustment, in 1051, the grayscale change rate of each pixel is multiplied by a grayscale of a corresponding pixel in the image to be processed, to obtain a second grayscale.

Because the image to be processed is an RGB image, grayscales of the three channels R, G, and B of the image to be processed need to be separately processed. The grayscale change rate of each pixel is multiplied by a grayscale of a corresponding pixel of each channel to acquire a second grayscale of each pixel of each channel.

In 1052, if a second grayscale of any pixel is greater than a second preset value, a grayscale of the any pixel is adjusted to the second preset value.

In an example, the second preset value needs to be correspondingly set according to a value type used by an image. If a grayscale of the image is represented by using unsigned 8-bit integers (uint8), that is, 0 to 255, the second preset value may be set to 255, and if a second grayscale of any pixel is greater than 255, 255 is used as a grayscale of the any pixel. If the grayscale of the image is represented by using double precision (double), that is, 0 to 1, the second preset value may be set to 1, and if a second grayscale of any pixel is greater than 1, 1 is used as the grayscale of the any pixel. Because the range of the grayscale change rate is large, the acquired second grayscale may exceed a grayscale display range of the image in a case that the grayscale change rate is greater than 1. In an actual application, the second preset value needs to be set according to a specific value type. Therefore, the second preset value is not specifically limited in the embodiment of the present disclosure.

The grayscales of the image are adjusted by using the second preset value, so that the grayscale range of the image can be kept within a displayable range of the image.

In 1053, the image after adjustment is acquired as a processed image.

Steps 1051 to 1053 are an example of a specific process of step 105 described above, i.e., processing the image to be processed based on the grayscale change rate of each pixel to acquire a processed image.

In another embodiment of the present disclosure, the image to be processed may be processed merely through multiplying the grayscale change rate of each pixel by the grayscale of the corresponding pixel in the image to be processed. A series of processing is performed on the image to be processed, and the shadowy area and the highlighted area are adjusted. The adjusted image is suitable for visual observation and acquisition of detailed information.

In the embodiment of the present disclosure, grayscales of each channel of an image are processed as follows: an image to be processed is acquired, and a single-channel brightness image is acquired based on grayscales of each channel of the image to be processed; Gaussian filtering is performed on the single-channel brightness image to acquire a Gaussian filtered image; grayscales of the Gaussian filtered image are adjusted based on the grayscales of the Gaussian filtered image and a preset proportion; the Gaussian filtered image after adjustment is compared with the Gaussian filtered image before adjustment, to acquire a grayscale change rate of each pixel through adjustment; the image to be processed is processed by multiplying the grayscale change rate of each pixel by a grayscale of a corresponding pixel in the image to be processed; and the processed image is output. In the technical solution provided in the embodiment of the present disclosure, an expression capability of all color channels is fully used; overall continuity of an image is ensured by performing Gaussian filtering on a single-channel brightness image; and a Gaussian filtered image is adjusted based on a preset proportion, so that a shadowy area and a highlighted area in the Gaussian filtered image tend to be neutral and more suitable for visual observation.

Figure 3:
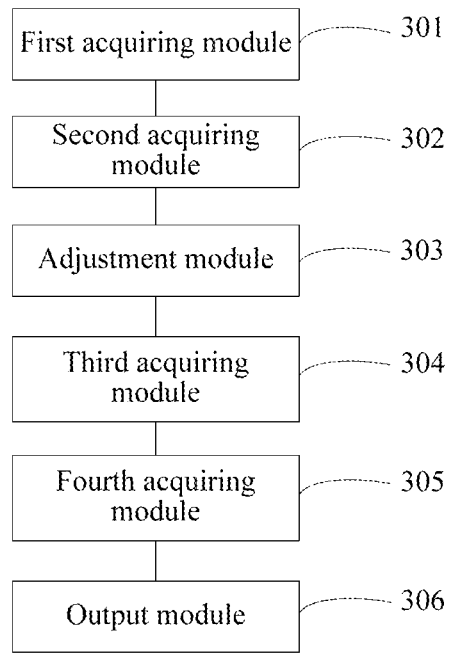
FIG. 3 is a structural block diagram of an apparatus for adjusting image brightness according to an embodiment of the present disclosure.

FIG. 3 is a structural block diagram of an apparatus for adjusting image brightness according to an embodiment of the present disclosure. As shown in FIG. 3, the apparatus includes: a first acquiring module 301, a second acquiring module 302, an adjustment module 303, a third acquiring module 304, a fourth acquiring module 305 and an output module 306.

The first acquiring module 301 is used to, acquire an image to be processed, and acquire a single-channel brightness image based on grayscales of each channel of the image to be processed.

Specifically, the first acquiring module 301 is used to acquire the image to be processed, compare grayscales of respective brightness channels of each pixel, acquire a maximum value of grayscales of each pixel, and determine the maximum value as the grayscale of each pixel, to obtain the single-channel brightness image.

The second acquiring module 302 is used to perform Gaussian filtering on the single-channel brightness image to acquire a Gaussian filtered image.

The adjustment module 303 is used to adjust grayscales of the Gaussian filtered image based on the grayscales of the Gaussian filtered image and a preset proportion.

Figure 4:
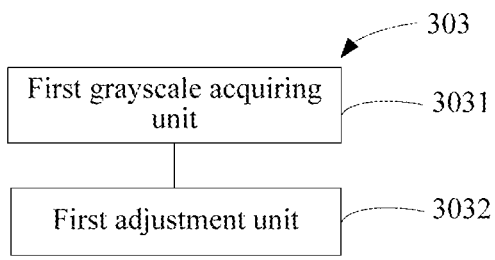
FIG. 4 is a structural block diagram of an adjustment module 303 according to an embodiment of the present disclosure.

In an example, as shown in FIG. 4, the adjustment module 303 includes: a first grayscale acquiring unit 3031 and a first adjustment unit 3032.

The first grayscale acquiring unit 3031 is used to acquire, based on the number of pixels of the Gaussian filtered image, grayscales of respective pixels, and the preset proportion, a first grayscale used for distinguishing a shadowy area and a highlighted area of the image.

Specifically, the first grayscale acquiring unit is used to determine the number of pixels corresponding to each grayscale in an ascending order of grayscale, based on the grayscale of each pixel of the Gaussian filtered image, determine a first value based on the number of the pixels of the Gaussian filtered image and the preset proportion, and acquire the first grayscale based on the first value and the determined number of the pixels corresponding to each grayscale.

The first adjustment unit 3032 is used to adjust the grayscales of the Gaussian filtered image based on the grayscale of each pixel of the Gaussian filtered image and the first grayscale.

Specifically, the first adjustment unit is used to, determine that an area formed by a first pixel is a shadowy area if a grayscale of the first pixel of the Gaussian filtered image is less than the first grayscale, and adjust the grayscale of the first pixel by applying $$L_2(p) = \frac{L_1(p) \times \left(1 + \frac{1}{s}\right)}{\frac{L_1(p)}{m} + \frac{1}{s}};$$

or perform no adjustment on a grayscale of a first pixel, if the grayscale of the first pixel of the Gaussian filtered image is equal to the first grayscale; or determine that an area formed by a first pixel is a highlighted area if a grayscale of the first pixel of the Gaussian filtered image is greater than the first grayscale, and adjust the grayscale of the first pixel by applying $$L_2(p) = 1 - \frac{(1 - L_1(p)) \times \left(1 + \frac{1}{h}\right)}{\frac{1 - L_1(p)}{1 - m} + \frac{1}{h}};$$

where p is location coordinates of the first pixel in the Gaussian filtered image, $L_2(p)$ is a grayscale of the first pixel after adjustment, $L_1(p)$ is a grayscale of the first pixel before adjustment, s is a preset parameter and s>0, m is the first grayscale, and h is a preset parameter and h>0.

The third acquiring module 304 is used to compare the Gaussian filtered image after adjustment with the Gaussian filtered image before adjustment to acquire a grayscale change rate of each pixel through adjustment.

The fourth acquiring module 305 is used to process the image to be processed based on the grayscale change rate of each pixel to acquire a processed image.

Figure 5:
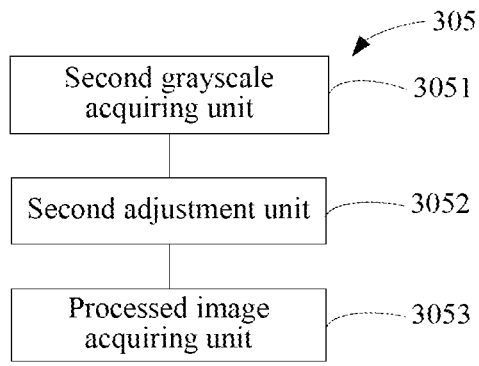
FIG. 5 is a structural block diagram of a fourth acquiring module 305 according to an embodiment of the present disclosure.

In an example, as shown in FIG. 5, the fourth acquiring module 305 includes:

a second grayscale acquiring unit 3051, used to multiply the grayscale change rate of each pixel by a grayscale of a corresponding pixel in the image to be processed to obtain a second grayscale;

a second adjustment unit 3052, used to adjust a grayscale of any pixel into a second preset value, if the second grayscale of the any pixel is greater than the second preset value; and a processed image acquiring unit 3053, used to acquire the image after adjustment as the processed image.

The output module 306 is used to output the processed image.

In the apparatus of the embodiment of the present disclosure, grayscales of each channel of an image are processed as follows: a first acquiring module 301 acquires an image to be processed, and acquires a single-channel brightness image based on grayscales of each channel of the image to be processed; a second acquiring module 302 performs Gaussian filtering on the single-channel brightness image to acquire a Gaussian filtered image; an adjustment module 303 adjusts grayscales of the Gaussian filtered image based on the grayscales of the Gaussian filtered image and a preset proportion; a third acquiring module 304 compares the Gaussian filtered image after adjustment with the Gaussian filtered image before adjustment to acquire a grayscale change rate of each pixel through adjustment; a fourth acquiring module 305 processes the image to be processed based on the grayscale change rate of each pixel to acquire a processed image; an output module 306 outputs the processed image. In the technical solution provided in the embodiment of the present disclosure, expression capability of all color channels is fully used; overall continuity of an image is ensured by performing Gaussian filtering on the single-channel brightness image; and a Gaussian filtered image is adjusted based on the preset proportion, so that a shadowy area and a highlighted area in the Gaussian filtered image tend to be neutral and more suitable for visual observation.

It should be noted that the above functional modules are only described for exemplary purposes when the apparatus for adjusting image brightness provided by the foregoing embodiment processes a shadowy area and a highlighted area of an image. In actual applications, the functions may be implemented by different functional modules as required, which means that the internal structure of the apparatus is divided to different functional modules stored in a storage of a computing apparatus and executed by at least one processor in the computing apparatus to implement all or some of the above described functions. In addition, the apparatus for adjusting image brightness that is provided by the foregoing embodiment is based on the same concept as the method for adjusting image brightness in the foregoing embodiments; for the specific implementation of the apparatus, reference may be made to the method embodiments, and the details are not described herein again.

A person of ordinary skill in the art may understand that all or some of the steps of the foregoing embodiments may be implemented by using hardware, or may be implemented by relevant hardware instructed by a program. The program may be stored in a computer readable storage medium. The storage medium may be a read-only memory, a magnetic disk, an optical disc, or the like.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A method for adjusting image brightness, comprising:
   acquiring an image to be processed, and acquiring a single-channel brightness image based on grayscales of each channel of the image to be processed;
   performing Gaussian filtering on the single-channel brightness image to acquire a Gaussian filtered image;
   adjusting grayscales of the Gaussian filtered image based on the grayscales of the Gaussian filtered image and a preset proportion;
   comparing the Gaussian filtered image after adjustment with the Gaussian filtered image before adjustment to acquire a grayscale change rate of each pixel through adjustment;
   processing the image based on the grayscale change rate of each pixel to acquire a processed image; and
   outputting the processed image.

2. The method according to claim 1, wherein the acquiring of the image to be processed, and the acquiring of the single-channel brightness image based on grayscales of each channel of the image to be processed, comprises:
   acquiring the image to be processed, and comparing grayscales of respective brightness channels of each pixel; and acquiring a maximum value from the grayscales of each pixel and determining the maximum value as a grayscale of each pixel to obtain the single-channel brightness image.

3. The method according to claim 1, wherein the adjusting of the grayscales of the Gaussian filtered image based on the grayscales of the Gaussian filtered image and the preset proportion, comprises:

acquiring based on the number of pixels of the Gaussian filtered image: a grayscale of each pixel and the preset proportion, a first grayscale used for distinguishing a shadowy area and a highlighted area of the image; and adjusting the grayscales of the Gaussian filtered image based on the grayscale of each pixel of the Gaussian filtered image and the first grayscale.

4. The method according to claim 3, wherein the acquiring, based on the number of pixels of the Gaussian filtered image: a grayscale of each pixel and the preset proportion, a first grayscale used for distinguishing a shadowy area and a highlighted area of the image, comprises:

determining the number of pixels corresponding to each grayscale in an ascending order of grayscale, based on the grayscale of each pixel of the Gaussian filtered image;

determining a first value based on the number of the pixels of the Gaussian filtered image and the preset proportion; and acquiring the first grayscale based on the first value and the determined number of the pixels corresponding to each grayscale.

5. The method according to claim 4, wherein the acquiring of the first grayscale based on the first value and the determined number of the pixels corresponding to each grayscale, comprises:

accumulating the determined number of the pixels corresponding to each grayscale one by one; and determining one grayscale as the first grayscale, if an accumulation result obtained before adding the number of the pixels corresponding to the one grayscale is less than the first value, and an accumulation result obtained after adding the number of the pixels corresponding to the one grayscale is greater than or equal to the first value.

6. The method according to claim 3, wherein the adjusting of the grayscales of the Gaussian filtered image based on the grayscale of each pixel of the Gaussian filtered image and the first grayscale, comprises:

determining that an area formed by a first pixel is a shadowy area if a grayscale of the first pixel of the Gaussian filtered image is less than the first grayscale, and adjusting the grayscale of the first pixel by applying $$L_2(p) = \frac{L_1(p) \times \left(1 + \frac{1}{s}\right)}{\frac{L_1(p)}{m} + \frac{1}{s}};$$

and performing no adjustment on a grayscale of a first pixel, if the grayscale of the first pixel of the Gaussian filtered image is equal to the first grayscale; or determining that an area formed by a first pixel is a highlighted area if a grayscale of the first pixel of the Gaussian filtered image is greater than the first grayscale, and adjusting the grayscale of the first pixel by applying $$L_2(p) = 1 - \frac{(1 - L_1(p)) \times \left(1 + \frac{1}{h}\right)}{\frac{1 - L_1(p)}{1 - m} + \frac{1}{h}};$$

wherein p is location coordinates of the first pixel in the Gaussian filtered image, $L_2(p)$ is a grayscale of the first pixel after adjustment, $L_1(P)$ is a grayscale of the first pixel before adjustment, s is a preset parameter and s>0, m is the first grayscale, and h is a preset parameter and h>0.

7. The method according to claim 3, wherein the processing of the image based on the grayscale change rate of each pixel to acquire the processed image, comprises:

multiplying the grayscale change rate of each pixel by a grayscale of a corresponding pixel in the image to be processed to obtain a second grayscale;

adjusting a grayscale of any pixel into a second preset value, if the second grayscale of the any pixel is greater than the second preset value; and acquiring the image after adjustment as the processed image.

8. An apparatus for adjusting image brightness, comprising at least one processor and a memory having processor-executable instructions stored therein, and the instructions when executed by the at least one processor, configure the apparatus to:

acquire an image to be processed, and acquire a single-channel brightness image based on grayscales of each channel of the image to be processed;

perform Gaussian filtering on the single-channel brightness image to acquire a Gaussian filtered image;

adjust grayscales of the Gaussian filtered image based on the grayscales of the Gaussian filtered image and a preset proportion;

compare the Gaussian filtered image after adjustment with the Gaussian filtered image before adjustment to acquire a grayscale change rate of each pixel through adjustment;

process the image based on the grayscale change rate of each pixel to acquire a processed image; and output the processed image.

9. The apparatus according to claim 8, wherein the apparatus is configured to:

acquire the image to be processed;

compare grayscales of respective brightness channels of each pixel;

acquire a maximum value from the grayscales of each pixel; and determine the maximum value as a grayscale of each pixel to obtain the single-channel brightness image.

10. The apparatus according to claim 8, wherein the apparatus is further configured to:

acquire, based on the number of pixels of the Gaussian filtered image: a grayscale of each pixel and the preset proportion, a first grayscale used for distinguishing a shadowy area and a highlighted area of the image; and adjust the grayscales of the Gaussian filtered image based on the grayscale of each pixel of the Gaussian filtered image and the first grayscale.

11. The apparatus according to claim 10, wherein the apparatus is configured to:
   determine the number of pixels corresponding to each grayscale in an ascending order of grayscale based on the grayscale of each pixel of the Gaussian filtered image;
   determine a first value based on the number of the pixels of the Gaussian filtered image and the preset proportion; and
   acquire the first grayscale based on the first value and the determined number of the pixels corresponding to each grayscale.

12. The apparatus according to claim 11, wherein the apparatus is configured to:
   determine the number of pixels corresponding to each grayscale in an ascending order of grayscale based on the grayscale of each pixel of the Gaussian filtered image;
   determine the first value based on the number of the pixels of the Gaussian filtered image and the preset proportion;
   accumulate the determined number of the pixels corresponding to each grayscale one by one; and
   determine one grayscale as the first grayscale, if an accumulation result obtained before adding the number of the pixels corresponding to the one grayscale is less than the first value, and an accumulation result obtained after adding the number of the pixels corresponding to the one grayscale is greater than or equal to the first value.

13. The apparatus according to claim 10, wherein the apparatus is configured to:
   determine that an area formed by a first pixel is a shadowy area if a grayscale of the first pixel of the Gaussian filtered image is less than the first grayscale, and adjust the grayscale of the first pixel by applying $$L_2(p) = \frac{L_1(p) \times \left(1 + \frac{1}{s}\right)}{\frac{L_1(p)}{m} + \frac{1}{s}};$$

and
   perform no adjustment on a grayscale of a first pixel, if the grayscale of the first pixel of the Gaussian filtered image is equal to the first grayscale; or
   determine that an area formed by a first pixel is a highlighted area if a grayscale of the first pixel of the Gaussian filtered image is greater than the first grayscale, and adjust the grayscale of the first pixel by applying $$L_2(p) = 1 - \frac{(1 - L_1(p)) \times \left(1 + \frac{1}{h}\right)}{\frac{1 - L_1(p)}{1 - m} + \frac{1}{h}};$$

wherein p is location coordinates of the first pixel in the Gaussian filtered image,
   $L_2(p)$ is a grayscale of the first pixel after adjustment,
   $L_1(p)$ is a grayscale of the first pixel before adjustment,
   s is a preset parameter and s>0, m is the first grayscale, and
   h is a preset parameter and h>0.

14. The apparatus according to claim 10, wherein the apparatus is configured to:
   multiply the grayscale change rate of each pixel by a grayscale of a corresponding pixel in the image to be processed to obtain a second grayscale;
   adjust a grayscale of any pixel into a second preset value, if the second grayscale of the any pixel is greater than the second preset value; and
   acquire the image after adjustment as the processed image.

* * * * *